Nov. 13, 1962
E. N. ROSENBERG
3,063,082
SUCTION CLEANER
Filed Aug. 3, 1960
4 Sheets-Sheet 1
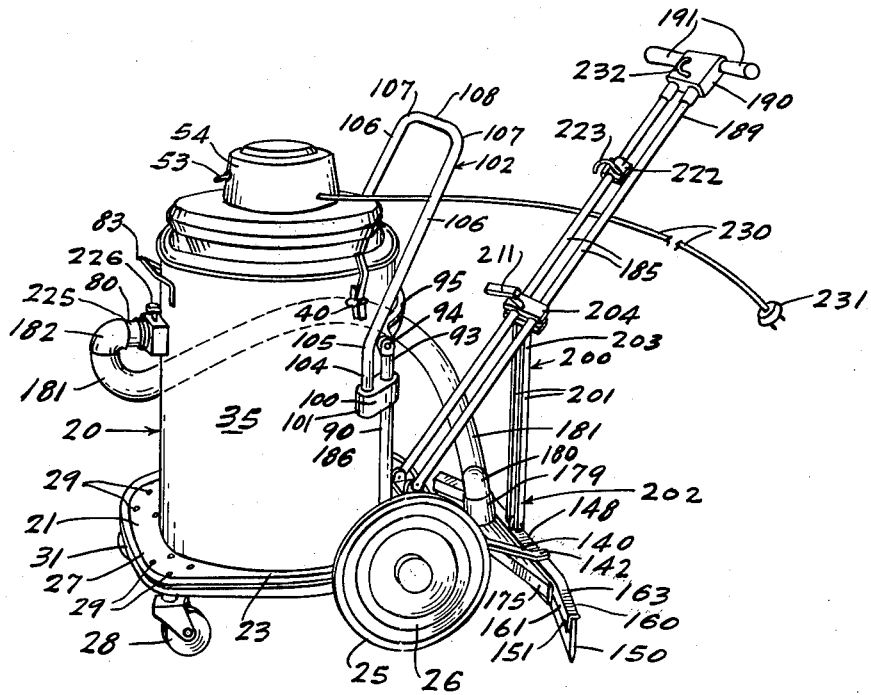
FIG-1-
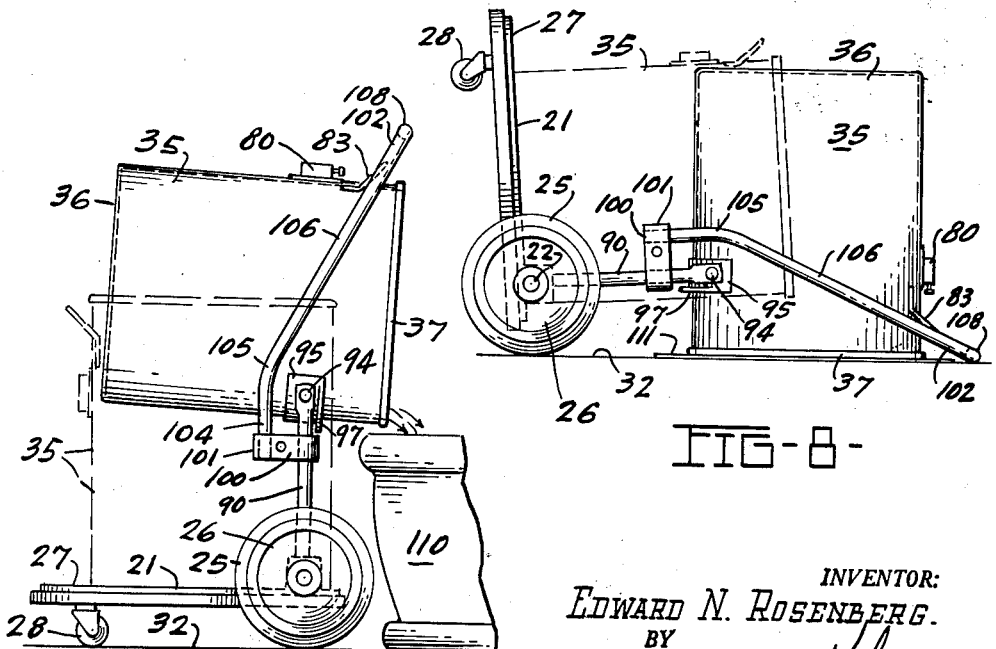
FIG-7-
FIG-8-
INVENTOR:
EDWARD N. ROSENBERG.
BY
ATT'Y.

Nov. 13, 1962  E. N. ROSENBERG  3,063,082
SUCTION CLEANER
Filed Aug. 3, 1960  4 Sheets-Sheet 2
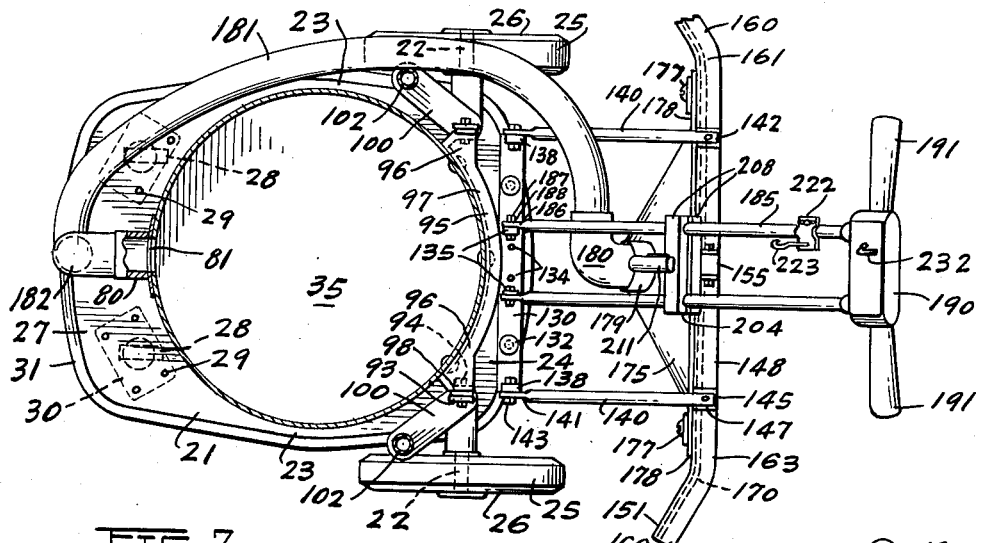
FIG-3-
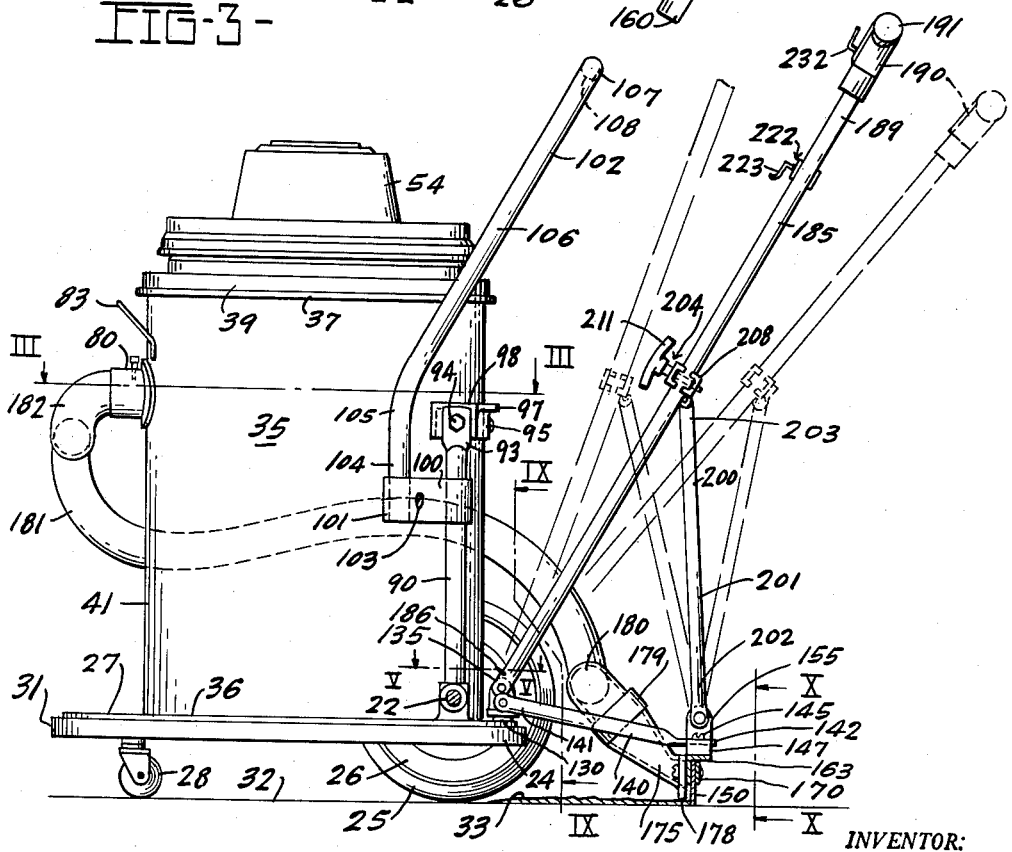
FIG-2-
INVENTOR:
EDWARD N. ROSENBERG.
BY
*Hugh A. Kirk*
ATT'Y.

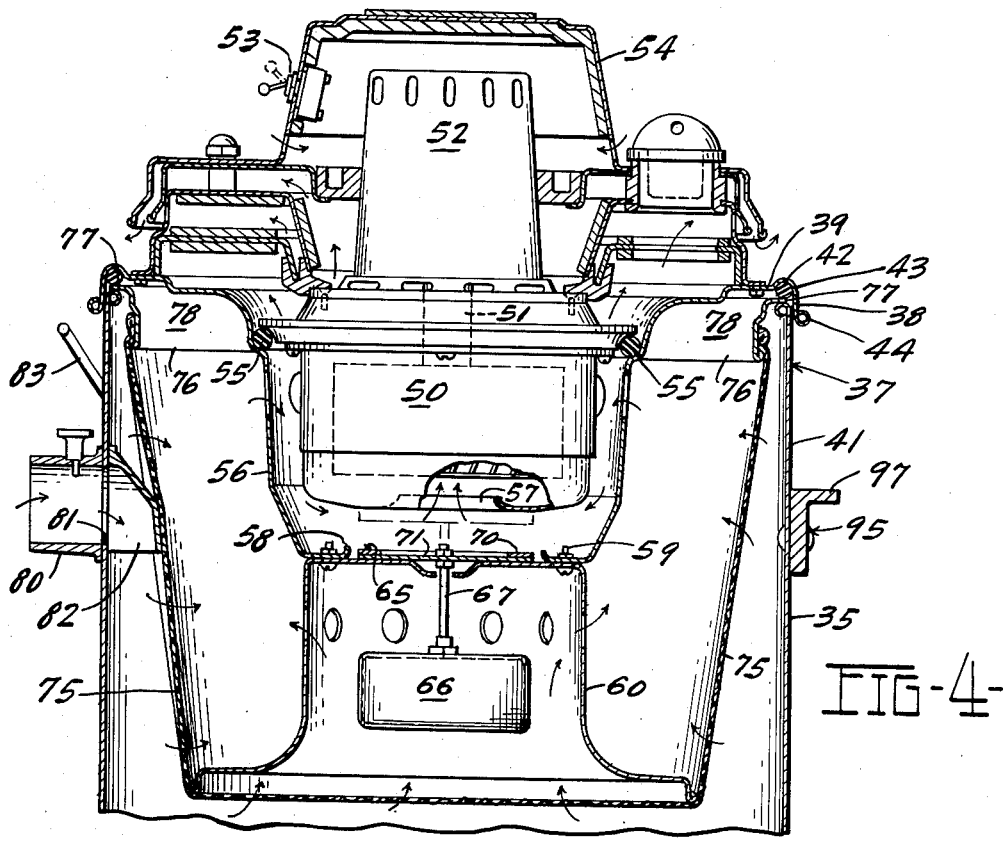
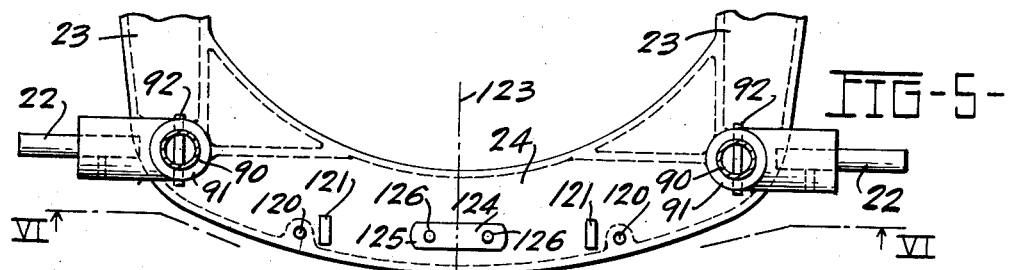
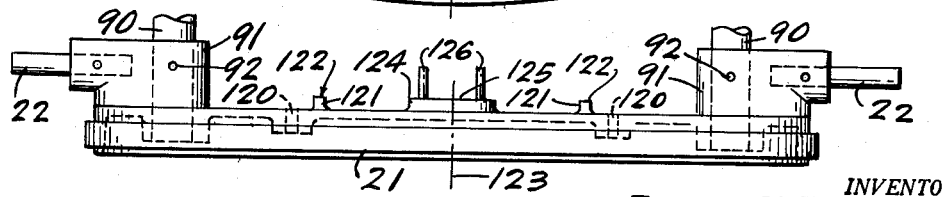

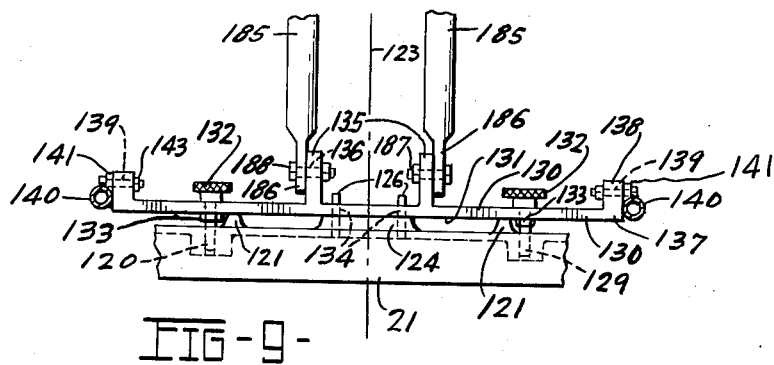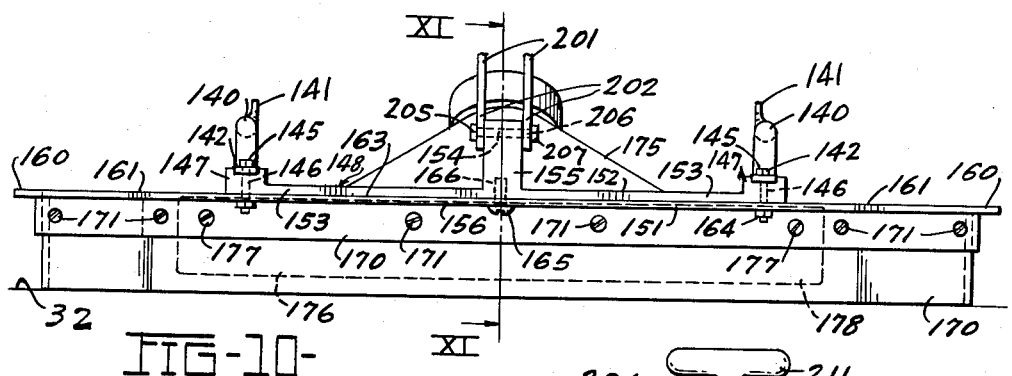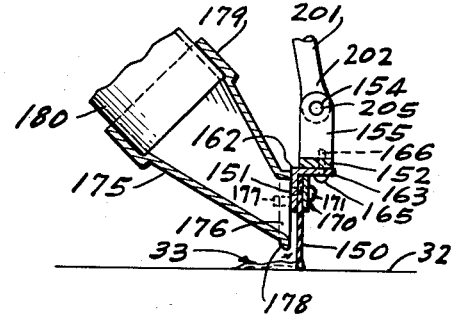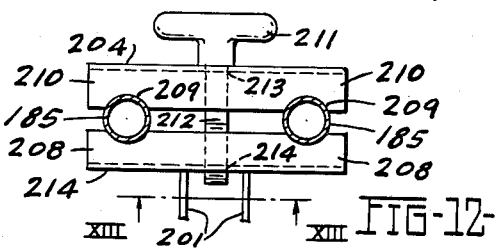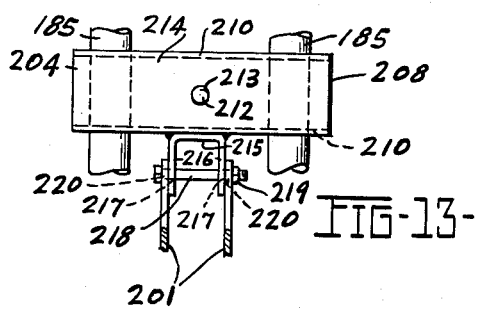

3,063,082
SUCTION CLEANER
Edward N. Rosenberg, Toledo, Ohio, assignor to The National Super Service Company, Toledo, Ohio, a corporation of Ohio
Filed Aug. 3, 1960, Ser. No. 47,306
22 Claims. (Cl. 15—327)

This invention relates to apparatus for the processing and treatment of surfaces of floors comprised of wood, terrazzo, plastic tile and the like. This invention is particularly directed to a new combination of elements which provide for wet and/or dry treatment of a floor surface and is especially adapted to devices using a suction means for recovering material, either solid or liquid or both from the surface of the floor.

Certain surfaces, particularly floors of public buildings or other buildings where large floor areas are encountered, require periodic restorative and/or cleaning treatment. Such treatment may be either a re-surfacing of a wooden floor such as by sanding. Other surfaces such as linoleum, vinyl rubber or asphalt tile, marble or concrete floors may be treated and enhanced in appearance by scrubbing with a detergent solution. In both cases material remaining on the floor after a certain stage of the cleaning or re-surfacing operation must be recovered, so that further treatment may be carried out or the material remaining on the floor surface may be recovered at the last stage in a floor treatment operation. In both cases the residuum on the surface is most conveniently recovered by a vacuum-cleaner-type appliance using a nozzle connected through ducting to a vacuum pump. Normally in conjunction with the vacuum pump there are provided means for separating the solid or liquid material from the air conveying such residuum particles. Such devices are known in the field of floor treatment operations. However, these devices are noted for a lack of flexibility, adaptability, and convenient utility.

Considerable labor is often required to empty the container of floor treatment devices in which water is collected after a floor has been mopped. Also in the past these devices have been manufactured with rigid and fixed handle means designed according to the dimensions of a fictionally "average" person. Since, even with a power operated device of the type used in the past, considerable labor extending over a long period of time is often required for the treatment of a floor surface. If the handle of the device is not at a convenient and comfortable elevation above the floor the operator of the device becomes unnecessarily fatigued.

In the devices used in the past where a flexible scraper or wiper blade is used to traverse the surface of the floor as a means of facilitating collection of the residuum to be collected by the device, the scraper blade is fixed relative to the device and relative to the floor. It is quite well known that a floor surface is not necessarily flat. Where a wiper blade is fixed relative to a floor surface assumed to be flat the pressure between the wiper and the floor is fixed. Thus, when a depression or hump is encountered in the floor surface, a decrease in the efficiency of operation of the vacuum-cleaner-type collection means is occasioned, necessitating considerable jockeying and maneuvering of the device to satisfactorily correct for the variance of pressure, or lack of pressure, and spacing between the floor and the wiper blade.

It is therefore an object of the present invention to provide an apparatus for processing surfaces which overcome the deficiencies and inefficiencies described in the devices existing.

It is an object of this invention to provide a simple, effective, efficient, and economic suction type surface treatment apparatus.

It is another object of this invention to provide a suction type surface treatment apparatus which may be used to recover either dry solid particles or liquids from the surface.

It is another object of this invention to provide a floor surface treatment device which is readily changed or adapted from a wet to a dry surface operation or vice versa.

It is another object of this invention to provide a device wherein the receptacle in which liquid material collected from a wet floor surface may be conveniently emptied of its contents with a minimum of labor on the part of the operator.

It is another object of this invention to provide a floor surface treating device embodying a flexible scraper or wiper blade wherein the pressure maintained between the blade and the floor surface is variable at the will of the operator of the device.

Another object of this invention is to provide a device whereby the handle, or that part of the machine which is grasped by the operator, may be adjustable to conform to the preference and comfort of the operator.

Still another object of this invention is to provide a floor surface treatment device which is flexible and versatile in that certain basic elements of the device may be used for operations other than recovery of residuum from the surface of a floor.

Still another object of this invention is to provide a device wherein a handle and wiper blade cooperating with the floor may be readily removable from the chassis or base of the device so that the unit may be more readily stored and/or to increase the usability and versatility of such a device.

Generally speaking, this invention is comprised of a chassis or bed plate mounted on wheels or casters. Upon this chassis may be mounted a normally vertical cylindrical receptacle or cannister for receiving the material recovered from the floor surface being operated upon by this invention. When the device is used on a dry floor surface a fabric filter may be inserted in the upper portion of the cannister. A vacuum pump or suction producing means may be mounted in a lid or cover which may be used to cover the cannister or drum when the apparatus is in operation collecting material from the floor surface.

Mounted on the chassis may be a handle which may be used for moving the wheeled chassis from place to place. This handle may extend at substantially right angles from the chassis and may be located adjacent the sides of the material receiving drum. Mounted between the chassis handle and the drum may be pivot means enabling the drum to be tilted relative to the chassis so that the drum contents may be emptied. This tilting process may be accomplished by grasping a handle mounted on the side of the drum opposite from the pivot means and lifting said handle.

An additional operator's handle may be mounted on the chassis in such a manner as to be readily removable from the chassis so as not to interfere with the drum emptying procedure. This operator's handle may be hinged to a plate carrying means for such detachable connection to the chassis of the device. A bowed rubber wiper or squee-gee may be bracketed to this hinged operator's handle. Extending from the wiper to the midportion of this hinged handle may be a brace equipped with a slidable clamp where it joins the hinged handle. This slidable clamp provides a means whereby the angle of the handle may be adjusted to suit the height of the operator. A suction nozzle may be located centrally of the bowed wiper and may be connected by means of a flexible duct to the vacuum pump associated with the drum located on the chassis.

The above mentioned and other features and objects of this invention and the manner of attaining them will become more apparent and the invention itself will be best understood by reference to the following description of an embodiment of the invention taken in conjunction with the accompanying drawings, wherein:

FIG. 1 is a perspective view showing one embodiment of the apparatus included in this invention;

FIG. 2 is an enlarged side elevation of the device showing the detachable handle and wiper unit, with various positions of the angularly adjustable handle being shown in dashed lines;

FIG. 3 is a cross-sectional view as may be taken along line III—III of FIG. 2;

FIG. 4 is an enlarged cut-away cross-sectional view showing a vacuum producer and mechanism associated with the removable cover of the drum of the device shown in FIGS. 1 or 2;

FIG. 5 is an enlarged top plan view as may be taken along line V—V of FIG. 2 showing the rear of the chassis casting;

FIG. 6 is an end view of the chassis as shown in FIG. 5 as may be taken along line VI—VI of FIG. 5;

FIG. 7 is a side elevation showing the invention of FIG. 1 with the handle and wiper sub-assembly removed, and showing the drum in emptying position when the device is used to collect liquid material;

FIG. 8, similar to FIG. 7, shows the chassis and drum in a position when the drum is completely inverted to be emptied of solid material which may have been collected in the drum;

FIG. 9 is an enlarged fragmentary view of FIG. 2, as may be taken along line IX—IX showing the rear of the chassis and the means for attaching the hinged operator-handle and wiper blade combination to the chassis;

FIG. 10 is an enlarged view as may be taken along line X—X of FIG. 2 showing a rear elevation of the nozzle and wiper blade assembly;

FIG. 11 is a cross-sectional view as may be taken along line XI—XI in FIG. 10, showing the alignment of the suction nozzle and the wiper blade in conjunction with a floor surface which may be treated with this invention;

FIG. 12 is an enlarged cross-sectional view as may be taken along line XII—XII of FIG. 2 showing the slidable handle clamping means; and FIG. 13 is a cross-sectional view as may be taken along line XIII—XIII of FIG. 12 showing the mounting means between the angle adjusting brace connected between the wiper blade assembly and the slidable handle clamping means.

I. THE CHASSIS

More specifically in the description of this invention, reference is had first to FIGS. 1, 2 and 3. The major component of the floor treatment device 20 may be considered to be a chassis or foundation plate 21 which, in the embodiment of the invention illustrated, may be of substantially rectangular form. The chassis plate may have axles 22 laterally oppositely extending from the sides 23 of the chassis 21 adjacent the rear portion 24 of the chassis 21. Tired 25 wheels 26 may be mounted on the axles 22. At the forward part 27 of the chassis 21 one or a pair of swivel casters 28 may be installed by rivets or bolts 29 passing through caster mounting plates 30 and the chassis 21 itself. A resilient scuff guard or bumper 31 may be affixed to the chassis 21 around its edges.

II. THE SUCTION DEVICE AND DIRT DRUM

Carried centrally of the chassis 21 may be a cylindrical container or receptacle drum 35 which may be of circular cross-section. It is to be understood that, in accordance with the objects of this invention, the drum 35 is not attached rigidly at its bottom 36 to the chassis plate 21.

At the top 37 of the drum 35 there may be formed an inwardly rolled rim 38. A cover 39 (refer to FIG. 4) may be attached to the top 37 of the drum 35 by clamps 40 mounted on the side walls 41 of the drum 35. A resilient gasket 42 may be installed along the rim 43 of the cover 39 adjacent a depending flange 44 which may cooperate with the top rim 38 of the drum 35.

Mounted within the cover 39 may be a vacuum pump 50 driven through shaft 51 by an electric motor 52 controlled by switch 53 located in a hood 54 covering the machinery in the cover 39. The vacuum pump 50 may be a multi-stage fan vacuum producer unit and may be gasketed 55 in a lid and motor frame 56. Suction air may enter the fan unit 50 through an aperture or vortex opening 57 in the bottom of the unit 50. Connected to the bottom 58 of the lid frame 56 by bolts 59 may be a bell-shaped filter spreader and perforated float bell 60 opening downwardly into the interior of the drum 35.

Since this floor surface treatment device 20 is intended to be used on either wet or dry surfaces, a shut-off device 65 is provided to be responsive to the level of the liquid collected and retained in drum 35 so that this liquid does not reach such a level that it enters the vacuum producer 50. This shut-off device 65 may be comprised of a float 66 inside the float bell 60 connected by a shaft 67 through an aperture 68 in the top 69 of the bell 60 to a gasketed 70 valve disc 71. When the liquid level in the drum 35 becomes sufficiently high, the float 66 raises the valve disc 71 against the bottom 58 of the fan unit 50 covering the vortex opening 57 and shutting off the suction air flow to the vacuum producer 50. This produces a change in the sound produced by the unit warning the operator of the device 20 that it is necessary to empty the drum 35 of its liquid contents.

If the device 20 is to be used for retrieving solid particles from a surface 32 (see FIG. 2), a bag-like fabric filter 75 which may have a plastic or metal rim 76 may be inserted in the opening at the top 37 of the drum 35 before the cover 39 is put in place. This filter rim 76 may have a flange 77 extending outwardly from the body 78 of the rim 76, which flange 77 may be held in place between the drum rim 38 and the cover 39 gasket 42 when the clamps 40 are snapped tight. The filter bag 75 may be maintained in the proper shape by the float bell 60.

Suction air may enter the drum 35 and the vacuum producer 50 through a tubular inlet 80 adjacent an aperture 81 located on the outside of the side wall 41 of the drum 35 somewhat below the rim 38 of the drum 35. On the interior of the drum 35 adjacent the aperture 81 may be located a deflector hood 82 to direct material carried by suction air downward into the receptacle drum 35. A handle 83 may be affixed to the walls 41 of the drum 35 above the suction air inlet 80.

III. CHASSIS AND DRUM PUSHING AND TILTING HANDLE ASSEMBLY

Mounted on the chassis plate 21 substantially on the axis formed by the axles 22 may be a pair of posts 90 held in sleeves 91 (see FIG. 6) on the chassis 21 by pins or bolts 92. These posts 90 may lie adjacent the vertical side walls 41 of the drum 35 and may be perpendicular to the chassis. The posts 90 may be of any cross-section, but in the preferred embodiment shown the posts 90 are formed of metal tubing.

At their upepr ends 93, the posts 90 may be pivotally mounted by bolt hinge pins 94 (see FIG. 2) to a drum yoke member 95 lying parallel to the chassis plate 21 attached by bolts, rivets or welding to the drum 35 at a location diametrically opposed to the inlet nozzle 80 for the suction air. The yoke member 95 may be curved to the radius of the drum 35 and may fit snugly against the drum between the ends 96 of the yoke 95. To increase the rigidity of the yoke 95, a flange 97 may extend outwardly from the drum 35 along the yoke 95 to the ends 96, at which ends 96 there may be apertured pivoting surfaces 98 cooperating with the bolt hinge pins 94.

Located on each of the pair of posts 90 somewhat below the upper end 93 of the posts 90 may be a chassis pushing handle foundation block 100 (see FIGS. 1 and 2) which may be clamped to the post 90 and extend outwardly and forwardly of the chassis in a manner substantially parallel to the nearest wall portion of the drum 35. Clamped in the free end 101 of the block may be a symmetrical chassis pushing and tilting pusher handle 102 held in place by the block and clamping bolt 103 in the block 100 itself. The pushing handle 102 may extend vertically 104 from the clamp parallel to the side walls 41 of drum 35 to a bend 105 where the handle 102 may be bent approximately 30° toward the rear of the device 20 (away from the drum 35) to form an angled section 106 lying in a plane parallel to the plane of the wheels 26 of the chassis 21. The angled section 106 may extend upward to a right angle bend 107 above the top of the hooded 54 cover 39 of the drum. At bend 107 the handle 102 may be angled to form a horizontal grasping portion 108 parallel to the chassis 21 and extending transversely of the device 20 to the plane of symmetry of the floor surface treatment device 20. Since the handle 102 is symmetrical, the handle 102 comprises two right angle bends 107, two sloping portions 106 lying parallel to each other, two 30° bends 105 and two vertically oriented portions 104 to be clamped in the handle clamping locks 100. The length of the sloping portions 106 of handle 102 should be of such length that, when the cover 39 is tilted about bolt hinge pins 94 at the top 93 of the posts 90 by a person grasping handle 83 on the front of the drum, the handle 83 clears the horizontal portion 108 of the handle 102 (refer to FIGS. 7 and 8).

If the device 20 is being used to recover moisture 33 from a floor surface 32, the drum 35 may be emptied of the collected liquid by removing the hose 181 and handle 185-wiper 150 combination, rolling the drum 35 and chassis 21 up to a water closet bowl 110 or other basin, and tilting the drum receptacle 35 upward about the pivot bolts 94 to pour the liquid into the water closet bowl 110 or a low sink as is illustrated in FIG. 7.

If the device 20 is used to collect solid particles from a floor surface 32, the filter 75 used in this case may be removed, and the chassis 21 may be tilted about the axis of the wheels 26 so that the horizontal handle portion 108 rests on the floor 32 and so that the drum 35 may be turned upside-down for completely emptying the solid particles therein on to a collector sheet 111 such as a newspaper spread on the floor 32 as shown in FIG. 8. In both FIGS. 7 and 8, the normal position of the drum 35 is shown in dotted lines.

IV. WIPER ATTACHMENT ASSEMBLY

A. Mounting Plate

At the rear 24 of the chassis 21 between the sleeves 91 provided for mounting the posts 90, there may be provided a pair of tapped bolting holes 120 (see FIGS. 5, 6 and 9) spaced apart from each other, with each of the holes 120 being located approximately half way between the center of the chassis 21 and the sides 23 of the chassis 21. Spaced from each of the holes 120 a short distance toward the center line 123 of the chassis 21 may be a raised side lug 121 having a top surface 122. Located across the centerline 123 may be a center raised lug 124 having a top surface 125 lying in the same plane as the top surfaces 122 of side lugs 121. From the top surface 125 of the center lug 124 may be a pair of elongated guide pins 126 disposed symmetrically of the center-line 123. The tapped holes 120 and the guide pins 126 may lie along a straight line extending transversely of the chassis.

Cooperating with the holes 120, the lugs 121 and 124, and the guide pins 126 may be a wiper sub-unit attachment bolting plate 130 having a flat bottom surface 131 cooperating with the surfaces 122 and 125 of the lugs 121 and 124 (refer to FIG. 9). Thumb screws 132 may be rotatably held in holes in the plate 130 by nuts 133 to cooperate with the tapped holes 120 in the chassis 21 to firmly hold the bolting plate 130 in position. For proper alignment of the bolting plate 130 on the chassis 21, holes 134 may be provided to cooperate with the guide pins 126 on the center lug 124 on the chassis 21 rear portion 24. Raised from the center portion of the bolting and foundation plate 130 may be a pair of lugs 135 having coaxial apertures 136 therein running longitudinally of the bolting plate 130. Each of these central lugs 135 may be located just outside of the holes 134 for the guide pins 126. At the ends 137 of the bolting plate 130 there may be an additional pair of lugs 138 raised from the upper surface of the bolting plate having an aperture 139 in each lug; which apertures 139 should be on a common axis but need not be coaxial with apertures 136 in lugs 135.

IV-B. The Wiper

A pair of wiper braces 140 may be connected and pivoted at one 141 of their ends 141 and 142 to the end lugs 138 of the bolting plate 130 by bolts 143 cooperating with apertures (not shown) in ends 141 of the braces 140 and apertures 139 in lugs 138. While the braces 140 may be of any acceptable form, in the embodiment of the brace illustrated in FIGS. 2, 3, 9, and 10 they are fabricated from equal lengths of metal tubing having their ends flattened for good connections and bearing surfaces. The other ends 142 of each of the two wiper braces 140 may be pivotally connected by bolts 145 (see FIGS. 10) cooperating in holes 146 in raised blocks 147 of a wiper mounting strip 148 connected to a wiper blade 150 holding frame 151. The wiper mounting strip 148 may be comprised of a strip portion 152 of material having the blocks 147 at its ends 153 and a larger raised and longitudinally (with respect to strip 152) apertured 154 block 155 at its middle portion. Mounting strip 148 may have a flat under surface 156 cooperating with the blade holding frame 151. The blade holding frame 151 may be a strip of metal positioned in juxtaposition with the upper forward portion of a resilient strip of wiper material 150, preferably a form of rubber, which extends below the holding frame 151. The wiper holding frame 151 and the wiper blade 150 may be of substantially the same length and may extend transversely of the surface treatment device 20. Spaced intermediate each of the ends 160 of the blade holding frame 151 and the center portion thereof may be an angled bend 161, causing the blade 150 to assume a bow-shaped configuration with the ends 160 of the frame 151 and blade 150 lying forwardly of the center portion of the frame 151 and blade 150. The top edge 162 of the frame 151 may have a flange 163 connected to it and extending rearwardly over the resilient blade 150; this flange 163 may run the length of the holding frame 151 (refer to FIG. 11). The mounting strip 148 may be affixed to the flange 163 by having the bolts 145, holding wiper brace 140 ends 142 to the blocks 147 of the pivot strip 148, pass through the blocks 147 and through the flange 163 to be secured below the flange 163 by nuts 164. Since the bolts 145 and nuts 164 are located at the ends 153 of the pivot strip 148, it may be desirable to additionally secure the pivot strip 148 to the flange 163 at the central portion of the strip 148 and flange 163 by passing a screw 165 through the flange 163 from its lower surface into a tapped hole 166 drilled in the central mounting strip block 155 from the under surface 156 thereof (refer to FIG. 10).

The flat resilient wiper strip or blade 150 may be affixed to the wiper holding frame 151 by placing a wiper blade backing strip 170, preferably formed of sheet metal to conform to the bends 161 of the holding frame 151, behind the wiper blade 150, sandwiching the wiper blade 150 between the holding frame 151 and the backing strip 170 with the top portion 162 of the wiper blade 150 abutting the flange 163 of the holding frame 151, and passing screws 171 through the three (3) layer sandwich thus formed to clamp the backing strip 170 to the frame 151.

Connected to the front and center of the wiper blade holding frame 151 along the straight portion between the angle bends 161 may be a suction nozzle 175 having a rectangular opening 176 adjacent the blade 150. This nozzle 175 may be attached to the wiper frame 151 by screws 177, passing through the nozzle opening flanges 178 and the three layer sandwich 151, 159 and 170 to be tapped into the blade backing strip 170 (refer to FIGS. 10 and 11). From the rectangular opening 176 adjacent the wiper blade 150, the nozzle 175 may gradually change shape to form a circular cylinder portion 179 which may enclose one end of an L (45° or 90°) tubing bend 180 (unthreaded as opposed to a pipe bend).

Between the tubing bend 180 of the suction nozzle 175 and the inlet tube 80 on the front of the receptacle drum 35 there may be run a length of flexible fluid-tight ducting or hose 181 connected to the tubing bend 180 and the inlet tube 80 by the frictional fit produced when the hose 181 is slipped over the tube bend 180 and the inlet 80 in drum 35. If it is desired, a tube bend 182 may be provided in conjunction with the inlet 80 to cooperate with the hose 181.

IV-C. Operating Handle

Referring again to FIGS. 2, 3 and 9, a pair of tubular steering members 185 may be pivotally connected at their lower flattened ends 186 to the central raised lugs 135 on the handle and wiper attachment plate 130 by nuts 187 and bolts 188 cooperating with an aperture (not shown) in the flattened ends 186 of the handle member 185 and the apertures 136 in the lugs 135. The handle members 185 may be of the same length and may be straight and extend parallel to each other to be connected, such as lug bolts, pins, rivets or the like, at their upper ends 189 in a handle grip spacing means 190. Extending outwardly from the grip spacer 190 may be a pair of handle grips 191 which may provide a place for the operator of the device 20 to grasp the device 20 for controlling its movements.

Thus, the operator's handle 185 and the wiper blade 150 and nozzle 175 subassembly are separately pivoted to the removable attachment plate 130 removably connected to the chassis 21 of the unit 20. So that the operator's handle 185 and the wiper blade 150 may be maintained in proper relationship, so that the angle of the handle 185 may be at a comfortable angle, relative to the chassis 21, for the operator, and so that the proper pressure may be maintained between the wiper blade 150 and the floor surface 32 acted upon, an adjustable angle setting brace 200, which may be comprised of two parallel members 201, may be pivotally connected at their ends 202 and 203 between the central lug 155, of the wiper mounting strip 148, and a slidable handle gripping means 204 cooperating with the parallel operator's handle members 185. The lower ends 202 of the parallel members 201 of the angle setting brace 200 may be located so that the ends 202 span the center block 155 of the wiper mounting strip 148, and then a bolt 205 may be passed through an aperture 206 in end 202 of one member 201, through hole 154 in block 155, and through aperture 206 in the other member 201 to be secured by a nut 207 (refer to FIG. 10).

The slidable handle gripping means 204 may be comprised of a pair of similar channel shaped members 208 having two arced cut-out portions 209 (see FIG. 12) in each of their flanges 210. These arced cut-out portions 209 may cooperate with the parallel handle members 185. When the members 208 are disposed on each side of the handle members 185 so that members 208 open their flanges 210 toward each other, a knob 211 having a threaded stud 212 affixed to it may tighten the members 208 against the handle elements 185 by passing the stud 212 through holes 213 and 214 centrally disposed in the webs of the handle clamping members 208; the member 208 opposite the knob 211 having the hole 214 being threaded to receive the stud 212. One of the members 208, preferably the one opposite from the knob 211, may have a U-shaped clip 215 (see FIG. 13) attached, such as by welding, to its lower or chassis side. In each of the legs 216 of clip 215 may be an aperture 217 which may cooperate with a bolt 218 and nut 219, and apertures 220 in the upper ends 203 of the angle brace members 201 to pivotally connect the members 201 to the slidable handle clamping means 204. The knob 211 also may be used as a handle for carrying the wiper attachment assembly when it is detached from the chassis 21 at plate 130.

To set the angle of the handle 185 to his choosing, the operator may turn the knob 211 so that the handle clamping means members 208 are loose from the handle elements 185, and then move the handle about the pivoting bolts 188 on the chassis attachment plate 130 until the desired position of the handle is obtained, then the knob 211 may be turned in the opposite direction to securely engage the handle clamping means 204. Then, since the wiper blade 150 is rigidly connected to the operator's handle 185 by the angle setting brace 200, to apply pressure to the wiper blade 150 the operator need only bear down on the handle grips 191. The dotted lines in FIG. 2 show the handle 185 in various positions it is capable of assuming.

To facilitate storage of the device 20 and to keep the resilient wiper blade 150 from being deformed by prolonged contact with a floor surface 32 when the device 20 is not in use, a clip 222 (see FIG. 1) having a pivoted hook 223 connected to the clip 222 may be attached to one of the parallel members 185 of the operator's handle so that the hook 223 may cooperate with the horizontal portion 108 of the chassis handle 102 when the operator's handle 185 is pivoted at 188 into juxtaposition with the chassis pushing handle 102.

With the apparatus described above, it can be seen that when the floor surface treatment device 20 is wheeled across a floor 32 having moisture 33 (see FIGS. 2 and 11) lying thereon, that when the wiper blade 150 is maintained in contact with the floor surface 32, that the moisture 33 is gathered between the bowed ends 160 of the wiper blade 150 and, because of the suction produced at the opening 176 of the nozzle 175, this moisture 33 is sucked into the nozzle 175 and discharged through the hose 181 into the receptacle drum 35 which is carried on the chassis 21 of the device 20 itself. After enough moisture 33 has been collected in the drum 35 to activate the float 66 shutting off the suction air passing through the vortex opening 57 in the vacuum pump 50, the change in sound of the pump notifies the operator that the device 20 requires emptying. The operator's handle and wiper blade sub-assembly 130, 150, and 185 may be detached from the chassis 21 merely by turning the thumb screws 132 which are provided with the handle attachment plate 130 to which the handle 185 and wiper blade 150 units are pivoted on bolts 143 and 188. The cover 39 with the suction machinery 50 and 52 attached thereto, may be removed from the top 37 of the drum 35, and the liquid filled drum 35 still retained on the chassis 21 may be wheeled 26 to a sink or toilet bowl 110 into which the liquid may be emptied by tilting the drum 35 about the hinge pins 94 by the operator grasping the handle 83 to facilitate the tipping (as shown in FIG. 7). To prevent tipping of the whole chassis also about the axis of the wheels 26 at this time, the operator may place his foot on the front end 27 of the chassis during this drum dumping operation.

If the floor surface treatment device 20 is used to recover solid particles, the only basic change in the operation of the device would be to install the filter 75 in the drum 35 between the rim 38 of the drum and the gasket 42 of the cover 39. When this is done, the filter 75 prevents solid particles from entering into the multi-stage vacuum producer 50 either when the floor has been vacuumed by the action of the suction air through the nozzle 175, or when the drum 35 is filled with solid particles. Again the handle-and-wiper blade sub-assembly 130, 150, and 185 connected to the attachment plate 130 may be removed from the chassis 21, and the top 39, and machinery 50 and 52 combined with the top 39 of the drum 35, may be removed, and the drum 35 turned upside down on to a newspaper 111 or other receptacle provided on the floor as was described previously (see FIG. 8).

When the operator's handle 185 and wiper blade 150 sub-assembly is removed from the chassis 21 it is necessary that the hose 181 be disconnected at either one of its ends, that is, either from the tube bend 180 associated with the nozzle 175 or from the tube bend 182 associated with the drum inlet tubing 80. This is a simple operation since there is only a friction fit between the hose 181, and either of the tube bends 180 or 182. However, if desired a snap or other type connection 225 with a manual spring urged releasing pin 226 as shown in FIG. 1 may be employed at one or both ends of the hose 181.

An electric cord 230 and electrical connector plug 231 (see FIG. 1) may be provided and may be connected to the dome 54 of the drum cover 39 to be interiorly connected to the switch 53 which controls the motor 52. So that the electric cord 230 will not lie on the floor surface 32 close to the wiper blade 150 where it might foul the blade 150, a hook 232, which may cooperate with the cord 230, may be attached to the handle grip spacer means 190 at the top ends 189 of the operator's handle members 185.

While there is described above the principles of this invention in connection with specific apparatus, it is to be clearly understood that this description is made only by way of example and not as a limitation to the scope of this invention.

What is claimed is:

1. A suction floor surface treatment device, comprising: a chassis, a receptacle having an open top supported on said chassis, a suction producer means associated with said receptacle, a pair of spaced uprights affixed to said chassis, receptacle pivot means attached to said receptacle intermediate of said top and said chassis connected to said uprights; a resilient surface cooperating scraper element trailing behind and connected to said chassis, steering and guiding means above said scraper element and connected to said chassis, means connecting said scraper element to said steering and guiding means, and means detachable from said chassis for pivotally connecting said scraper element and said steering and guiding means to said chassis.

2. A device according to claim 1 wherein said means connected between said scraper element and said guiding means includes means for varying the geometrical relationship of said scraper element to said guiding means.

3. A device according to claim 1 wherein said suction producer means is incorporated in a demountable cover for said receptacle.

4. A device according to claim 1 including a suction inlet nozzle adjacent said scraper element, a suction inlet to the interior of said recceptacle and a detachable and flexible duct between said nozzle and said suction inlet.

5. A device according to claim 4 wherein said scraper element has ends bowed forward of said nozzle to entrap particles along said blade and to guide said particles to said inlet nozzle.

6. A device according to claim 5 including wheels on said chassis of said device and wherein said ends of said scraper element extend beyond and behind said wheels.

7. A device according to claim 1 including a fabric filter insertable in said open top of said receptacle between said receptacle and said vacuum producer means.

8. A suction type wet floor treatment apparatus, comprising: a wheeled chassis, a receptacle supported on said chassis, a suction producing means mounted to said receptacle, a guiding means detachably mounted to said chassis, a floor engaging flexible bowed scraper mounted on said chassis and connected to said guiding means, means between said flexible bowed scraper and said guiding means for angularly adjusting said guiding means with respect to said scraper and said chassis, suction inlet means located centrally of the ends of said bowed scraper, and flexible ducting means removably connected between said suction inlet and said suction producing means.

9. A device according to claim 8 including pivot means mounted to said chassis cooperating with means attached to said receptacle for tilting said receptacle with respect to said chassis.

10. A device according to claim 8 including a cover demountable on said receptacle, wherein said vacuum producing means is contained in said cover.

11. A device according to claim 10 including a fabric filter insertable between said receptacle and said cover.

12. A device according to claim 8 including a pushing handle fixedly mounted on said chassis.

13. A surface treatment apparatus comprising a wheeled chassis having a platform portion, a receptacle having its bottom resting on said platform portion, suction providing motor means associated with said receptacle for collecting particles from the surface into said receptacle, a removable cover for said receptacle incorporating said suction producing means in said cover, manual guiding means rigidly mounted on said chassis and extending from said platform portion adjacent said receptacle, and cooperating pivot means spaced from said platform portion and associated with said guiding means and intermediate the top and bottom of said receptacle for pivoting said receptacle on an axis traverse of said guiding means, whereby said receptacle may be tilted relative to said guiding means and said chassis about said axis for emptying said receptacle of its contents.

14. A device according to claim 13 including a contents inlet member mounted on said receptacle opposite from said pivot means.

15. A device according to claim 13 including a filter insertable between said receptacle and said cover.

16. A surface treatment apparatus comprising: a wheeled chassis, a receptacle mounted on said chassis, suction producing motor means associated with said receptacle for collecting particles from a surface into said receptacle, manual guiding means rigidly mounted on said chassis and extending from said chassis adjacent said receptacle, cooperating pivot means spaced from said chassis and associated with said guiding means and intermediate the top and bottom of said receptacle for pivoting said receptacle on an axis transverse of said guiding means, whereby said receptacle may be titled relative to said guiding means and said chassis about said axis for emptying said receptacle of its contents, a second guiding means, a resilient scraper element, means for removably attaching said second guiding means and scraper element to said chassis, and means for hingedly attaching said second guiding means and said scraper element to said removable attaching means.

17. A device according to claim 16 including adjustable brace means connected between said scraper element and said second guiding means.

18. In a floor treatment suction cleaner having a wheeled chassis, a container on said chassis, a suction producing means mounted to said container and a suction duct extending from said container, the improvement comprising: a floor wiper and guiding handle means with said guiding handle positioned over and above said floor wiper, means for pivotally attaching said floor wiper and guiding handle means to said chassis, and means for connecting said floor wiper and said guiding handle together on the same side of said pivot means so that downward pressure applied to said guiding handle applies downward pressure to said floor wiper.

19. A cleaner according to claim 18 wherein said floor wiper includes a suction nozzle associated therewith and means for removably connecting said suction duct to said suction nozzle.

20. A cleaner according to claim 18 wherein said connecting means between said floor wiper and guiding handle means includes means for adjusting the relative distance between said floor wiper and said guiding handle.

21. In a floor treatment suction cleaner having a wheeled chassis, an open top container on said chassis, a suction producing means mounted to said container, means to removably attach said suction producing means to the top of said container, the improvement comprising: spaced uprights mounted on said chassis adjacent opposite sides of said container, pivot means between said uprights and said container for tilting said container about an axis between the bottom and top of said container, and a chassis guiding handle fixedly attached to said spaced uprights and positioned so that said container is tiltable about said pivot means relative to both said chassis and said handle.

22. A floor treatment suction cleaner having a wheeled chassis, an open top container supported by its bottom on said chassis, a suction producing means mounted to said container, means for removably attaching said suction producing means to the top of said container, a suction duct extending from said container, pivot means mounted on said chassis between said top and bottom of said container for tiltably mounting said container on said chassis, floor wiper and chassis pusher handle means removably and pivotally mounted on said chassis, a suction nozzle associated with said wiper and removably connected to said suction duct, and means for adjusting said pusher handle relative to said floor wiper whereby said pusher handle adjusts the pressure of said wiper against said floor as desired by the operator of said pusher handle.

References Cited in the file of this patent

UNITED STATES PATENTS

| | | |
|---|---|---|
| 511,543 | Palmer et al. | Dec. 26, 1893 |
| 1,220,640 | Kelly | Mar. 27, 1917 |
| 1,297,384 | Meyers | Mar. 18, 1919 |
| 2,543,833 | Clark | Mar. 6, 1951 |
| 2,643,732 | Keen | June 30, 1953 |
| 2,719,596 | Kent et al. | Oct. 4, 1955 |
| 2,876,484 | Wells | Mar. 10, 1959 |
| 2,914,791 | Wells | Dec. 1, 1959 |

FOREIGN PATENTS

| | | |
|---|---|---|
| 45,478 | Norway | Aug. 13, 1928 |